United States Patent
Fukuzaki

Patent Number: 6,020,849
Date of Patent: Feb. 1, 2000

[54] POSITION DETECTING APPARATUS AND POINTING DEVICE THEREOF

[75] Inventor: Yasuhiro Fukuzaki, Otone-machi, Japan

[73] Assignee: Wacom Co. Ltd., Japan

[21] Appl. No.: 08/585,786

[22] Filed: Jan. 16, 1996

[30] Foreign Application Priority Data

Apr. 10, 1995 [JP] Japan .................................. 7-108987

[51] Int. Cl.⁷ .................................................. H01Q 3/02
[52] U.S. Cl. ......................... 342/374; 342/452; 178/19; 178/87; 345/158; 345/179
[58] Field of Search ................................. 342/448, 434, 342/437, 452, 374; 455/100; 178/87, 19; 345/158, 179

[56] References Cited

U.S. PATENT DOCUMENTS

| | | | |
|---|---|---|---|
| 4,999,461 | 3/1991 | Murakami et al. | 178/19 |
| 5,028,745 | 7/1991 | Yamanami et al. | 178/19 |
| 5,073,781 | 12/1991 | Stickelbrocks | 342/51 |
| 5,386,219 | 1/1995 | Greanias et al. | 345/174 |
| 5,398,036 | 3/1995 | Nakase et al. | 343/860 |
| 5,552,568 | 9/1996 | Onodaka et al. | 178/15 |

FOREIGN PATENT DOCUMENTS

| | | |
|---|---|---|
| 6370326 | 3/1988 | Japan . |
| 63108424 | 5/1988 | Japan . |
| 63108425 | 5/1988 | Japan . |
| 63108426 | 5/1988 | Japan . |
| 253805 | 2/1990 | Japan . |
| 3147012 | 6/1991 | Japan . |
| 5181582 | 7/1993 | Japan . |

*Primary Examiner*—Thomas H. Tarcza
*Assistant Examiner*—Dao L. Pham
*Attorney, Agent, or Firm*—Joseph W. Berenato, III

[57] ABSTRACT

A position detecting system capable of making communications with a plurality of pointing devices without changing resonance circuits of said pointing devices, and a pointing device suitable for the position detecting system. The position detecting system detects positions of at least two cordless pointing devices on a two-dimensional plane and is equipped with a command electromagnetic wave transmitting circuit to transmit a command to the pointing device. Included in the position detecting system are a first group of antennae X1 to X11 arranged successively in one of the directions orthogonal to each other within the two-dimensional plane 11, a second group of antennae Y1 to Y8 arranged successively in the other direction orthogonal to the one direction within the two-dimensional plane 11, a selection circuit for, from the first and second antenna groups, selecting an antenna which is more strongly coupled to the pointing device to be measured than to the other pointing device in transmitting an electromagnetic wave, and a transmission circuit for transmitting an electromagnetic wave from the selected antenna to the pointing device to be measured.

11 Claims, 8 Drawing Sheets

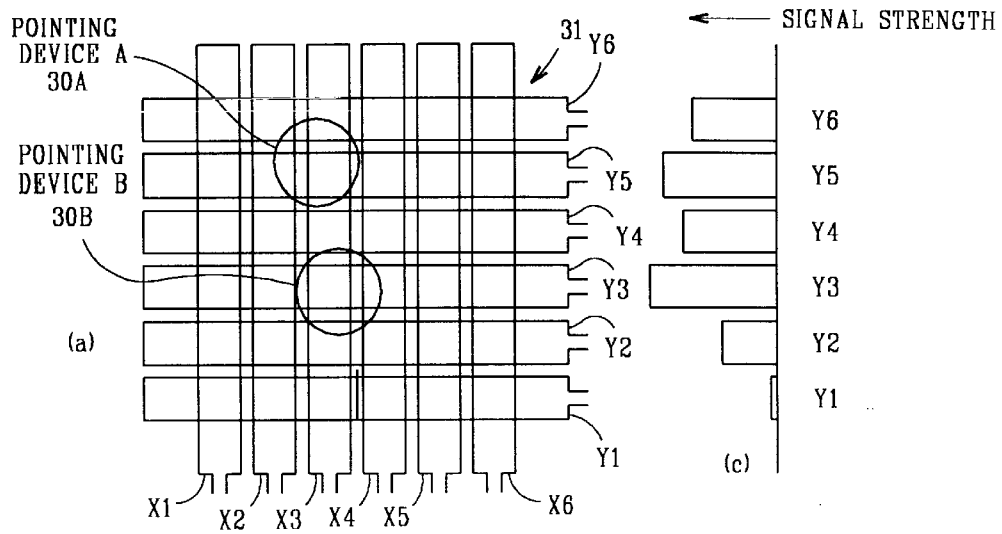
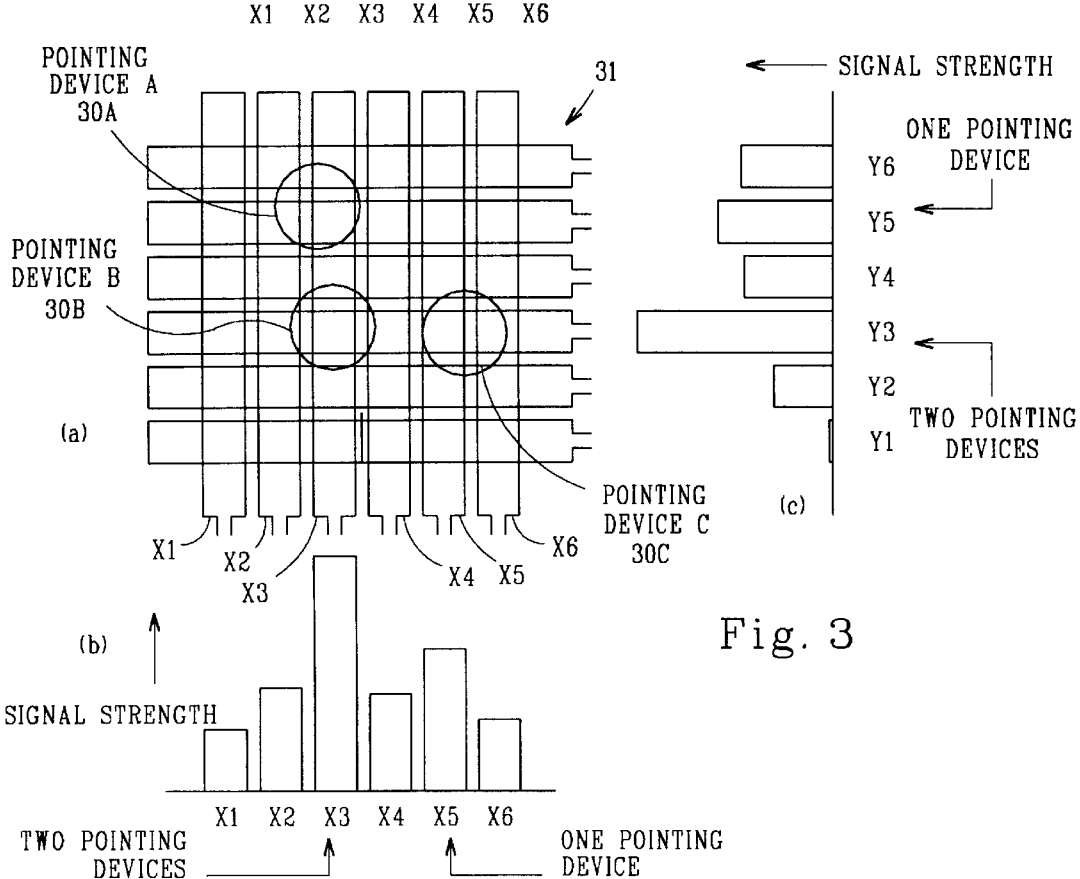
Fig. 2
Fig. 3

Fig. 8
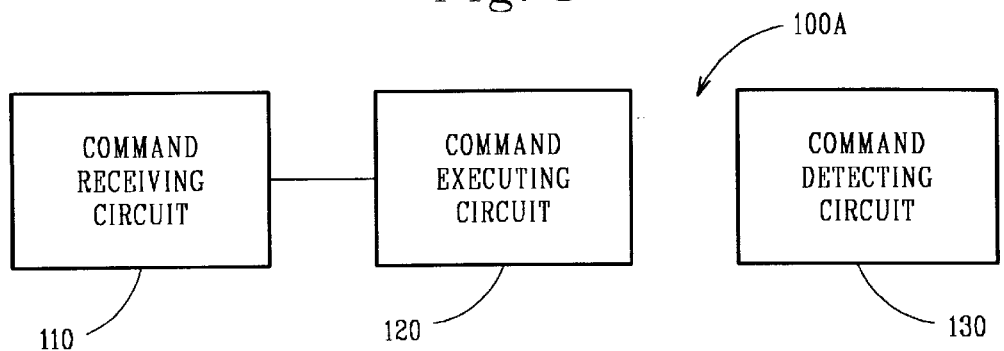
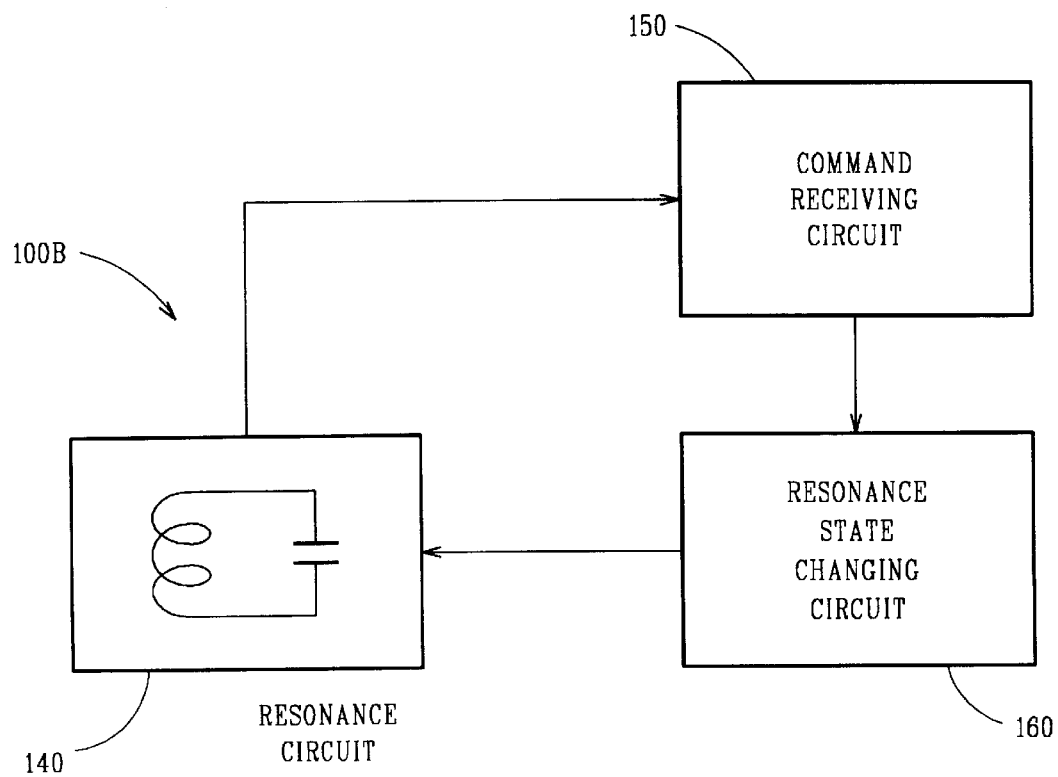
Fig. 9

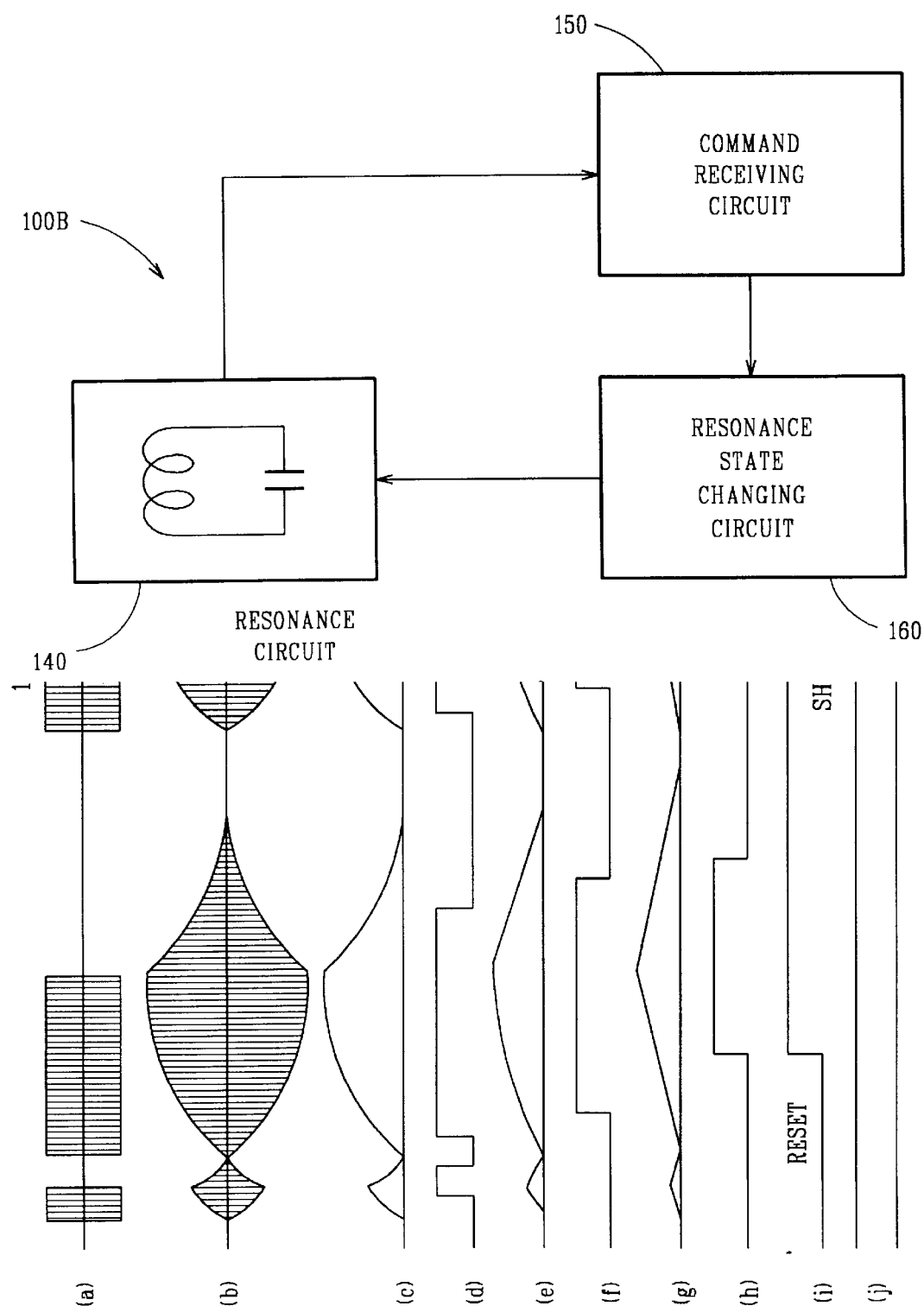

POSITION DETECTING APPARATUS AND POINTING DEVICE THEREOF

BACKGROUND OF THE INVENTION

1. Field of the Invention

The present invention relates generally to a position detecting system and position detecting method using a plurality of position pointing devices.

2. Description of the Prior Art

As one of the position detecting modes on a digitizer there is what is known as an electromagnetic-signal transmitting and receiving mode. For example, this comprises a position detecting surface including a number of loop coils arranged parallel to each other, and a pointing device, such as a pen and cursor, wherein the loop coils are used as sensors, i.e., antennas, so that transmission and reception of electromagnetic waves are carried out between the loop coils and pointing device to sense a coordinate of the pointing device and other information on the basis of the resulting detection signal. One important feature of this mode is providing a cordless pointing device which therefore does not require any cord. As disclosed in Japanese Patent Publication No. 2-53805 and Japanese Patent Laid-Open No. 3-147012, the present applicant has proposed a variety of digitizers based on this electromagnetic signal transmitting and receiving mode. One of the major problems in these applications relates to how to avoid noises and to accurately and quickly obtain information on the basis of the reception signal.

In such an electromagnetic signal transmitting and receiving mode, a transmission and reception operation, in which, for example, an electromagnetic wave is transmitted from one selected antenna which in turn again receives an electromagnetic wave re-transmitted from a resonance circuit or coil within the pointing device, is repeatedly practiced with the antennae being changed in turn, so that a calculation containing interpolation is made on the basis of the signal from the antenna attendant with the strongest reception signal and the signals from the antennae close thereto, thereby determining the coordinate of the pointing device.

In addition, cordless position detecting systems using a plurality of such pointing devices have been well-known, for example, Japanese Patent Laid-Open Nos. 63-70326, 63-108424, 63-108425, 63-108426. In such systems, resonance frequencies of resonance circuits of two pointing devices are set to be different from each other so that the position detection is accomplished by using the resonance frequency of the resonance circuit of one pointing device subjected to coordinate detection to avoid interference from the resonance circuit of the other pointing device.

Moreover, a cordless position detecting system has also been known which uses a pointing device containing batteries. Such a pointing device containing batteries is based on the operational principle that an electromagnetic wave is one-sidedly transmitted from the pointing device. For using a plurality of pointing devices on such an operational principle, the simplest way is to have the frequencies of the electromagnetic waves to be transmitted from the respective pointing devices adapted to be different from each other so as to implement reception at every frequency.

On the other hand, a new method of use has been proposed wherein a cordless pointing device is not limited to only an input device, but is used as a means to store, display and output information (for example, as disclosed in Japanese Patent Laid-Open No. 5-181582). In this case, it is required to accomplish the position instruction operation and information communication at a cordless state.

For information exchange with a specific one of a plurality of pointing devices to be simultaneously used, a means should be needed which is capable of selectively establishing communication with the specific pointing device. Particularly, a transmission means which is capable of transmitting information to only the specific pointing device is important. On the other hand, for reception of information from the specific pointing device, there is no particular problem, because control may be made so as to perform the transmission by only the specific pointing device.

As a way of implementing the selective communication with a specific plurality of pointing devices, a method of assigning different inherent electromagnetic-wave frequencies to the respective pointing devices is known. However, in this instance, difficulty is experienced in simultaneously using a plurality of pointing devices to which the same frequency is assigned. For this reason, combinations of pointing devices to be simultaneously used are subjected to limitations, thus causing the users to be thrown into confusion.

This problem also applies to the case of employing a resonance circuit of a pointing device in common as a means to make communication for the purpose of coordinate detection of the pointing device. That is, in a case where the resonance frequencies of resonance circuits of pointing devices to be used simultaneously are the same, it is impossible to similarly perform both the position detection and communication. For this reason, there is the need for different frequencies being assigned in advance to resonance circuits of a plurality of pointing devices, and therefore, as well as the above, combinations of pointing devices to be simultaneously used are limited, thus resulting in the users being brought to confusion.

BRIEF SUMMARY OF THE INVENTION

It is therefore an object of the present invention to provide a position detecting system which is capable of communications with a plurality of pointing devices without changing frequencies of the respective pointing devices, and further provide a pointing device suitable therefore.

According to the present invention, with an electromagnetic wave being concentratedly transmitted to a specific position, information can be sent to only a specific pointing device. Since the pointing device is material and does not simultaneously occupy different places, when the electromagnetic wave is concentratedly transmitted to a specific position, only the specific pointing device can receive the strong electromagnetic wave.

In the case where two pointing devices are provided, transmission is made with one antenna being selected from a plurality of antennae arranged side by side in the X-axial or Y-axial direction, thus making it possible to transmit a strong electromagnetic wave to only one specific pointing device.

On the other hand, in the case that three or more pointing devices are provided, it is not able to transmit a strong electromagnetic wave to each of specific pointing device, with only one antenna while, if in this case a plurality of antennae contribute to transmission, a strong electromagnetic wave can be transmitted to only a specific pointing device. In other words, by selecting a combination of an antenna in the X-axial direction and an antenna in the Y-axial direction, it is possible to give a strong electromagnetic wave to only a specific pointing device.

Furthermore, when implementing the transmission of electromagnetic waves with combinations of a plurality of antennae, if other pointing devices exist at positions exposed to the influences, an electromagnetic wave having an appropriate strength and having the antiphase is transmitted from an appropriate antenna so that the transmitted electromagnetic wave can be cancelled at the position where it is predicted that the other pointing devices exist, thereby cancelling the effects on the other pointing devices.

Since the aforesaid antennae arranged side by side in the X-axial and Y-axial directions are mounted on a position detecting system, which performs the transmission and reception of electromagnetic waves for the purpose of detecting the positions of the pointing devices, it is also possible to use the antennae in common as antennae for information communications as described above.

In particular, in a position detecting system of the type where a pointing device contains a resonance circuit, for position detection an internal circuit of the pointing device is operable using a portion of the power applied to the resonance circuit.

In addition, in such a position detecting system where the pointing device contains a resonance circuit, giving instructions to a specific pointing device as described above, it is also possible to, for example, execute the control so that the resonance circuit of the pointing device does not come into operation for a fixed time period. Consequently, if only the resonance circuit of a specific pointing device is controlled to be operable, its position is detectable without being subjected to interference with other pointing devices. Thus, when the resonance circuits of the respective pointing devices are selected one by one in turn and only the selected one is controlled to operate, the coordinates of all the pointing devices are detectable with no interference from the other pointing devices. In this case, any combination of the pointing devices are is applicable with only one resonance frequency.

Moreover, giving a command to a specific pointing device permits the resonance frequency of the resonance circuit of the specific pointing device to be changeable. Accordingly, if the resonance frequencies of the respective pointing devices are adapted to be changed to different frequencies, it is possible to achieve position detection of the pointing devices and information communication by using specific frequencies set individually for the pointing devices afterwards. In this case, there is no need for instructions always being continuously given to control the resonance circuits of the pointing devices, thus resulting in efficiently displaying its function.

Furthermore, in such a case of changing the frequencies of the pointing devices to make communications, a new pointing device coming into a detectable area is responsive to the initial frequency, whereby, after recognizing this, its resonance frequency is changeable to a vacant frequency so as to make preparations for a newly added pointing device.

The change of the resonance frequency of the pointing device as described above can make effective communication by means of avoiding a specific frequency band containing external noises.

These and other objects, features and advantages of the invention will become more apparent upon reading the following detailed specification and drawings.

BRIEF DESCRIPTION OF THE DRAWING

FIGS. 2A, 2B and 2C are illustrations describing one example of a command transmission according to this invention.

FIGS. 3A, 3B and 3C are illustrations describing an embodiment using three pointing devices.

FIG. 7A showing a conventional example and FIG. 7B showing an antenna scanning method during signal transmission and reception according to the embodiment of this invention.

FIG. 8 is an illustration of an arrangement of a pointing device according to an embodiment.

FIG. 9 is an illustration of another arrangement of a pointing device according to the embodiment.

FIG. 13 is a waveform illustration for describing transmission of command information and operation of the interior of a pointing device associated therewith according to the embodiment.

DETAILED DESCRIPTION OF THE PREFERRED EMBODIMENT

The present invention will be described below with reference to the embodiments.

Figure 1:
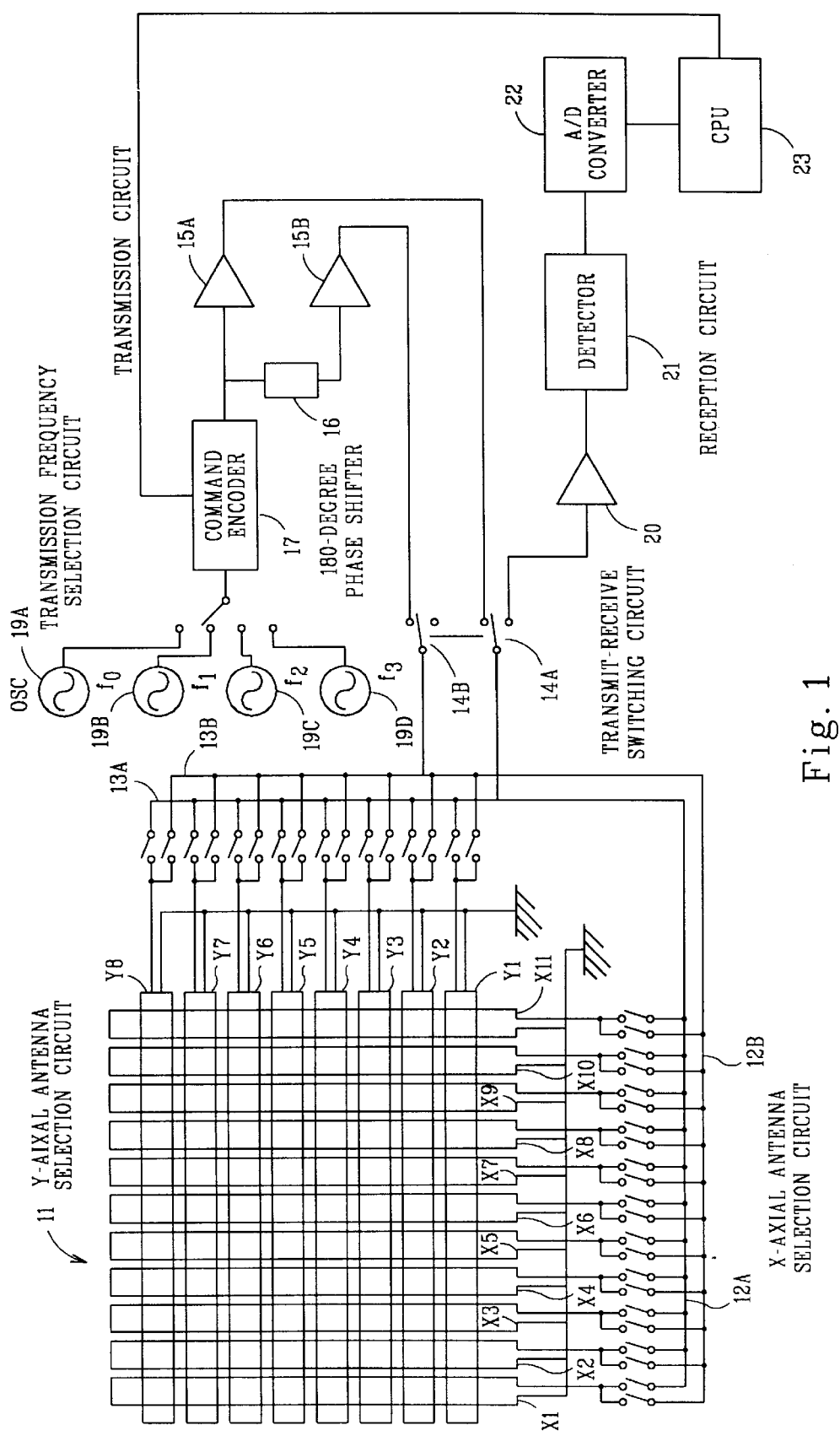
FIG. 1 is a schematic illustration of an arrangement of a position detecting system according to an embodiment of the present invention.

FIG. 1 conceptionally shows an arrangement of a position detecting system according to an embodiment of this invention. In a two-dimensional plane 11 of the position detecting system, there are provided a first group of a plurality of antennae X1 to X11 (11 antennae in the illustration) arranged in the X-axial direction and a second group of a plurality of antennae Y1 to Y8 (8 antennae in the illustration) arranged in the Y-axial direction. To these antenna groups X1 to X11 and Y1 to Y8 there are respectively connected X-axial antenna switching circuits 12A, 12B and the Y-axial antenna switching circuits 13A, 13B.

The one end of the X-axial antenna switching circuit 12A and the one end of the Y-axial antenna switching circuit 13A are coupled through a transmit-receive switching circuit 14A to a transmitting circuit 15A, while the other end of the X-axial antenna switching circuit 12B and the other end of the Y-axial antenna switching circuit 13B are coupled through a transmit-receive switching circuit 14B to a transmitting circuit 15B. Here, the transmitting circuit 15A is directly connected to a command encoder 17, while the transmitting circuit 15B is coupled through a 180-degree phase shifter 16 to the command encoder 17. The command encoder 17 is connected to a transmission frequency selection circuit 18 which in turn, is coupled to oscillators 19A to 19D whose source frequencies are f0, f1, f2, and f3.

On the other hand, the one end of the X-axial antenna switching circuits 12A and the one end of the Y-axial antenna switching circuits 13A are also connectable through the transmit-receive switching circuits 14A to a receiving circuit 20, detector 21, A/D (analog-to-digital) converter 22, and CPU (central processing unit) 23. The CPU 23 analyzes the information the receiving circuit 20 receives, and is operative to supply the command encoder 17 with the information which is transmitted through the transmitting circuits 15A, 15B.

Furthermore, a description will be made herein below in terms of an embodiment wherein a plurality of pointing devices are used in the position detecting system in order to make information communications between each of the devices and the system. Here, each of the plurality of pointing devices include a resonance circuit comprising a coil and capacitor, and is made to accomplish the position detection without requiring any cord (cordless structure). The resonance circuits, in their initial state, substantially have the common resonance frequency f0.

In the system, an electromagnetic wave can be transmitted from the transmitting circuits 15A, 15B to a given pointing device; the frequency of the electromagnetic wave being close to the resonance frequency of the resonance circuit of the pointing device. A response electromagnetic wave generated due to the electromagnetic interaction of this electromagnetic wave, and resonance circuit, is received by the receiving circuit 20 so as to analyze the response power distribution thereof for measuring the coordinate of the pointing device. In addition, it is also possible to carry out the transmission and reception of information to and from the given pointing device.

As a possible example of such information transmission and reception, there is a case of transmitting information such as your own name, address, and credit number from a pointing device for simplification of input, transmitting information such as your body size and favorite color for utilization in an electronic order system, or storing information such as your case history, names of drugs now in use and emergency address in the pointing device for utilization asemergency information. On the contrary, for this information to be inputted through a keyboard connected to the position detecting system then to be stored in a pointing device, it is also possible to make transmission of the information from the position detecting system to the pointing device.

For such position measurement of a specific pointing device and for information transmission and reception to and from the pointing device, one or a plurality of antennae are selected from the group of X-axial antennae X1 to X11 and the group of Y-axial antennae Y1 to Y8 to transmit and receive the above information. Further, the position detection can be achieved by transmitting from a specific antenna and then by receiving the response with the respective antennae being scanned, wherein in order to completely avoid the influence from the other pointing devices, different resonance frequencies are assigned to pointing devices to be used respectively, and then the position measurement and information transmission and reception are carried out with these resonance frequencies afterwards. A description will be made later in terms of this case.

First, the transmission and reception to and from the respective antennae X1 to X1 and Y11 to Y8 are implemented at the initial frequency f0 so as to measure the strength distribution of the electromagnetic waves returning from the respective pointing devices, thus allowing approximate position measurement of the respective pointing devices.

A more detailed example will be described with reference to FIGS. 2A to 2C. That is, as shown in FIG. 2A, pointing devices 30A and 30B are placed on a two-dimensional plane 30 including the antennae X1 to X6 and Y1 to Y6 which in turn, are scanned to measure the reception signal strengths.

This measurement the result of is illustrated in FIGS. 2B and 2C. According to this result, of the X-axial antenna group the antenna X3 shows a large reception signal, and of the Y-axial antenna group the antennas Y3, Y5 indicate large reception signals. It is obvious from this that difficulty is encountered in supplying a specific pointing device with a strong electromagnetic wave when electromagnetic waves are transmitted from the X-axial antenna group, while, if electromagnetic waves are transmitted from the Y-axial antennae Y3 and Y5, the pointing devices 30B and 30A can receive strong electromagnetic waves. Accordingly, the antennae Y5 and Y3 are selected as antennae for the pointing devices 30A and 30B.

Moreover, FIGS. 3A to 3C show an example using three pointing devices. Even in this case, where all the antennae are scanned at a state with repeated transmission and reception to and from all the pointing devices, the reception signal strengths of the respective antennae are obtainable as shown in FIGS. 3B and 3C. From this, it is recognized that two pointing devices are located at the position of the antenna X3, one pointing device is placed at the position of the antenna X5, two pointing devices are present at the position of the antenna Y3, and one pointing device exists at the position of the antenna Y5. Subsequently, transmission is made from the antenna X3 and reception is made by the antennae Y3 and Y5, whereby it becomes obvious that one pointing device is present at the point of intersection of the antennae X3 and Y3, and another pointing device is present at the point of intersection of the antennae X3 and Y5. In addition, when transmission is effected by the antenna X5 and reception is implemented by the antennae Y3 and Y5, it is recognized that a pointing device exists at the point of intersection of the antennae X5 and Y3, while no pointing device is present at the point of intersection of the antennae X5 and Y5. Accordingly, the antennae Y5 and X5 can be selected as transmission antennae for the pointing devices 30A and 30C. Furthermore, for the position pointing device 30B, two antennae X3 and Y3 are to be selected. That is, if electromagnetic waves are simultaneously transmitted from the antennae X3 and Y3 to the pointing device 30B, it is possible to send to the device 30B an electromagnetic wave stronger than electromagnetic waves to the other pointing devices.

Secondly, a command electromagnetic wave is transmitted from one or a plurality of antennae thus selected to a specific pointing device to give an instruction indicative of the change of its resonance frequency from f0 to f1, by which instruction the resonance frequency of the specific pointing device turns to f1 and, hence, it is no longer responsive to the frequency f0. Similarly, command electromagnetic waves are transmitted to other pointing devices to make the transmission frequencies become f2, f3 and f4, respectively.

Thereafter, necessary information communication is made to each pointing device using different frequencies f0, f1, f2 or f3. Moreover, with the respective antennae being scanned, the response electromagnetic wave from the resonance circuit of the pointing device is received to accurately execute the position measurement of the pointing device on the basis of its distribution characteristic.

Figure 4:
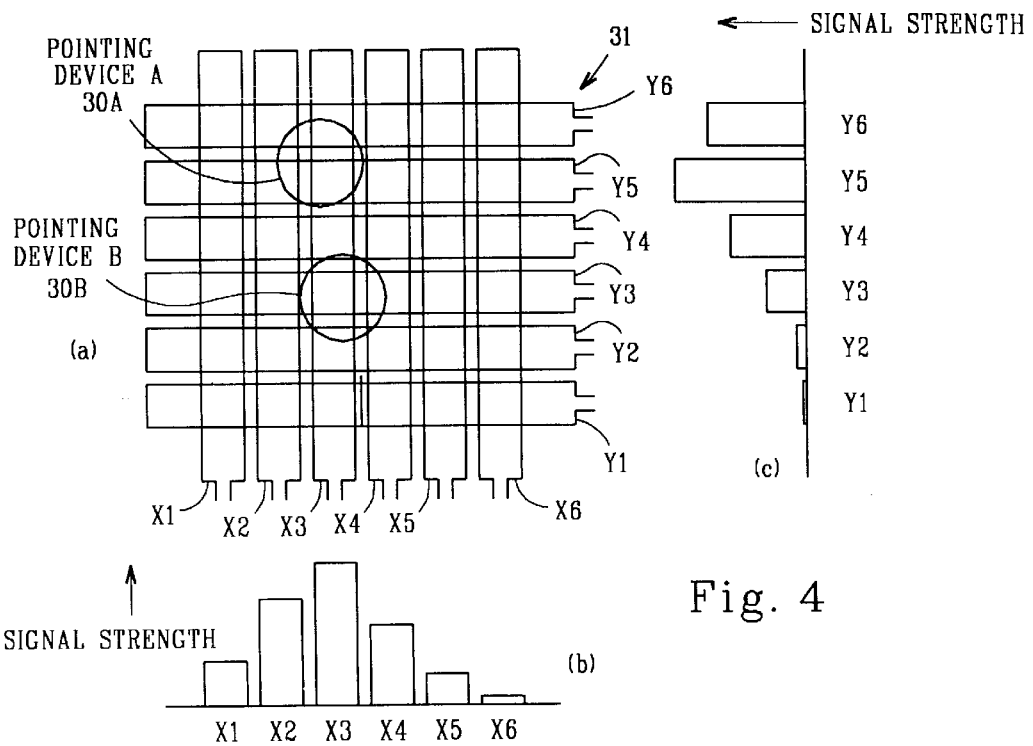
FIGS. 4A, 4B and 4C are illustrations describing an example of signal reception in the embodiment.

In this case, when a new pointing device enters an effective area, the pointing device is responsive to the frequency f0. Accordingly, monitoring this frequency allows immediate recognition of the new pointing device entering it. In a similar way, a new frequency can be assigned to the new pointing device. Furthermore, a description will be made in terms of an example of successively measuring the positions of a plurality of pointing devices to which frequencies are respectively assigned. An antenna is selected for a specific pointing device which is a measured object, while an electromagnetic wave with a frequency close to the resonance frequency (f0, f1, f2 or f3) of the resonance circuit of the specific pointing device is transmitted from the selected antenna to the specific pointing device. Subsequently, all the antennae are scanned for receiving the response electromagnetic wave due to the electromagnetic interaction between the transmitted electromagnetic wave and the resonance circuit of the pointing device, in which case the coordinate of the pointing device is determined in accordance with the results. One example of the results is shown in FIGS. 4A to 4C. As obvious from FIGS. 4A and 4B, the position of the pointing device 30A is placed at the intersection between the antennae X3 and Y5.

Figure 5:
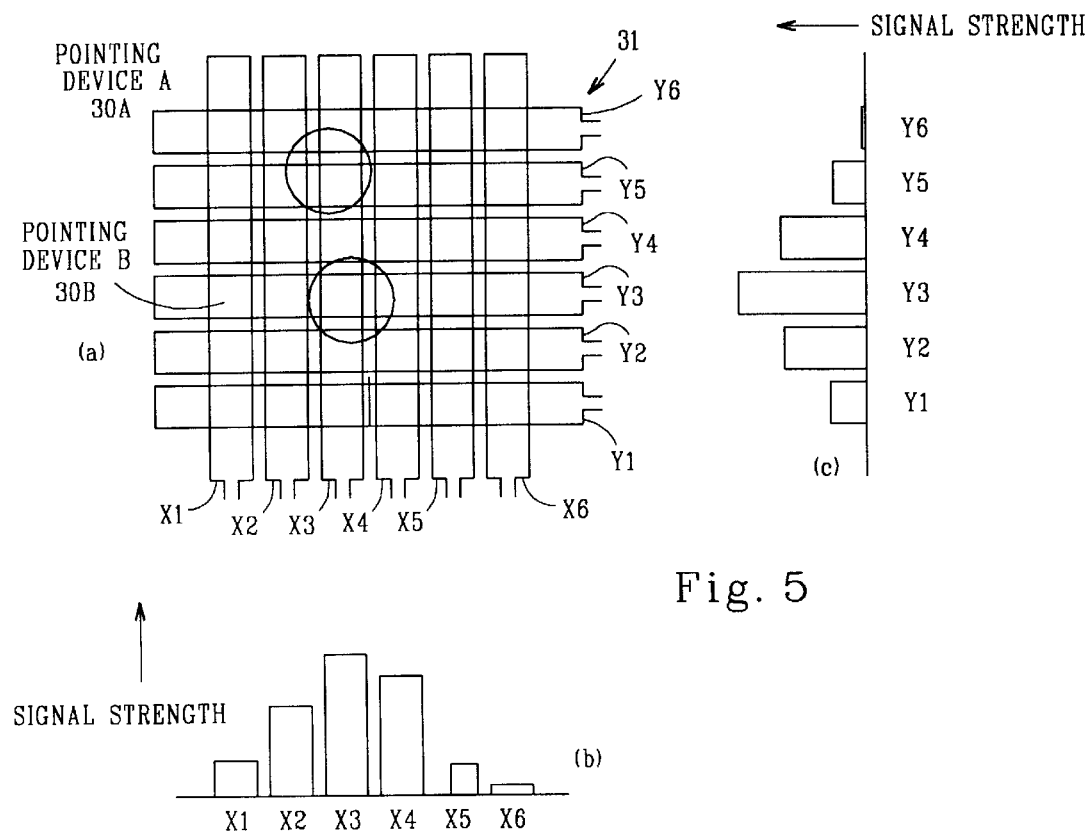
FIGS. 5A, 5B and 5C show one example of a waveform of a reception signal in the embodiment.

Then, a decision is made as to whether a further pointing device to be measured exists or not. If so, the aforesaid measurement is repeatedly implemented. For this embodiment, the pointing device 30B will be the next object to be measured. For this reason, the antenna Y3 subsequently transmits an electromagnetic wave with a frequency close to the resonance frequency of the resonance circuit of the pointing device. In addition, the respective antennae are scanned for receiving the response electromagnetic waves, which allows for determination of the position of the pointing device 30B in accordance with the results. One example of the results is shown in FIGS. 5A and 5B. From FIGS. 5B and 5C, it is obvious that the position of the pointing device 30B is present at the intersection between the antennae X3 and Y3.

Figure 6:
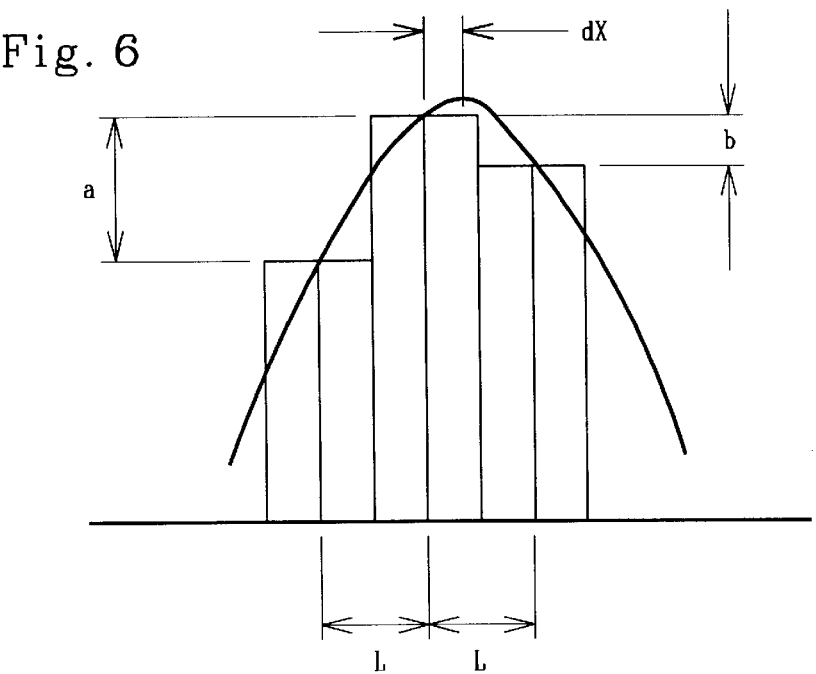
FIG. 6 is an illustration describing a coordinate measurement in the embodiment.

For actually calculating the coordinate of a pointing device, for instance as shown in FIG. 6, the waveform of the received signal is sampled at the antenna so as to obtain the differences a and b between the peak antenna signal strength and the adjacent antenna signal strengths. Assuming that the antenna pitch is taken as L, the difference dX between the position of the peak-indicating antenna and the actual peak signal strength position (the position of the pointing device) can be expressed in accordance with the following equation. Accordingly, use of this equation permits the calculation of the coordinate of the pointing device.

$$dX = \{(a-b)/(a+b)\} \times (L/2)$$

Figure 7:
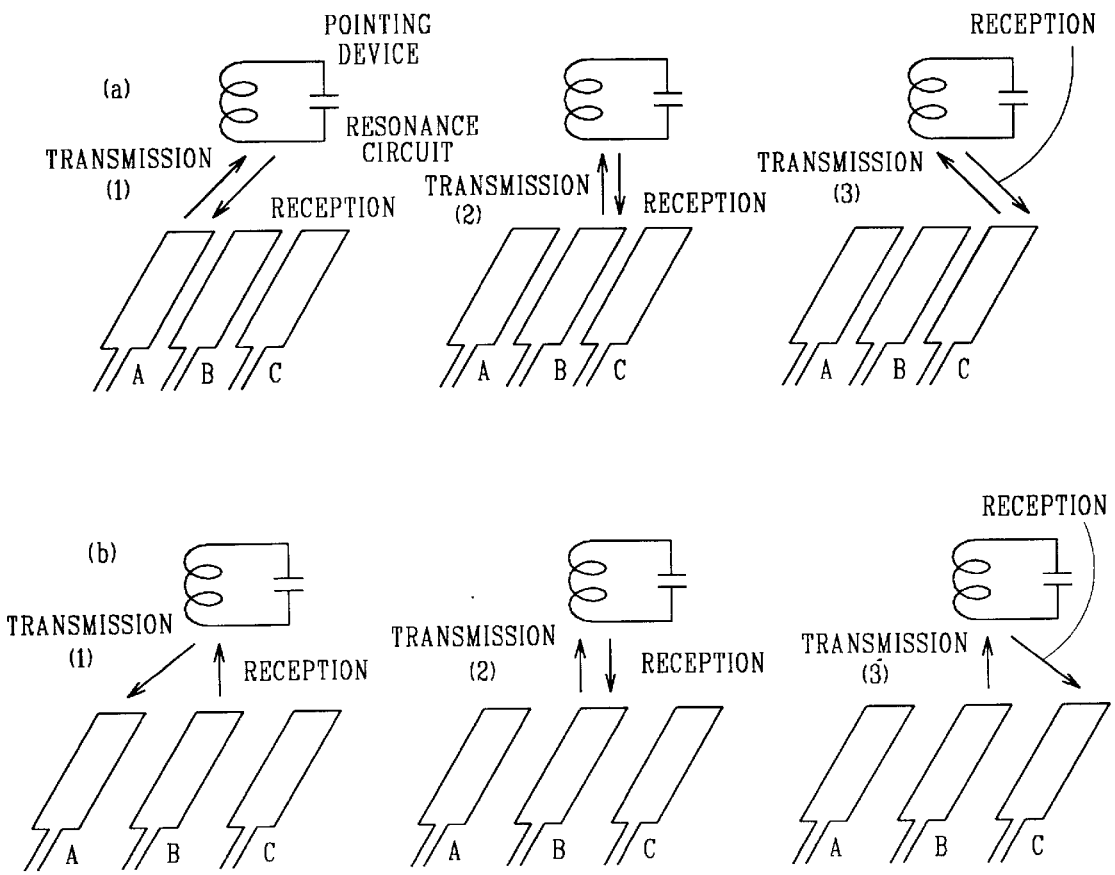
FIGS. 7A and 7B are illustrations describing antenna scanning methods.

As described above, according to this invention, as a method of measuring the pointing device coordinate, an electromagnetic wave is transmitted fixedly to the closest antenna to the pointing device and the antennae are scanned in turn only during the reception. The comparison of this transmit-receive method with a conventional method is shown in FIGS. 7A and 7B. In the conventional method, as illustrated in FIG. 7A, the transmission and reception to and from an antenna are carried out with the antenna scanned, while as illustrated in FIG. 7B according to this invention a transmitting antenna is fixed and antennae are scanned only during the reception. Although this method has already been proposed by this applicant, adopting a method like this embodiment makes it possible to prevent the interference between a plurality of pointing devices without requiring assignment of different frequencies to the resonance circuits of the respective pointing devices, selecting an antenna most strongly coupled to a pointing device to be measured for transmission, and receiving the response electromagnetic wave. Since in this embodiment resonance frequencies are assigned to the resonance circuits of the respective pointing devices so as to avoid the interference therebetween, it is possible to completely eliminate interference by other pointing devices for position detection.

Although in the above-mentioned embodiment the antennae are adapted to be successively scanned during the reception, it is also possible that a plurality of receiving circuits are provided so as to simultaneously accomplish receptions from a plurality of antennae.

As described above, the position detection of the respective pointing devices and information exchange therewith do not always require the assignment of different frequencies to the respective pointing devices, but can be effected with an electromagnetic wave being transmitted so as to achieve the strong connection with only a specific pointing device. In particular, for only transmission of information, with the transmission made as digital information, it is possible to readily transmit command information to only a pointing device present at a specific location even if the difference between the transmission strengths is small. Accordingly, giving the aforesaid command for setting a resonance frequency is relatively easy and the information exchange and position detection can be performed afterwards without any interference with other pointing devices.

Furthermore, even if no resonance frequency is individually set to each pointing device, when (as described above) an electromagnetic wave is transmitted to only a specific pointing device, information exchange and position detection are possible. However, when the three or more pointing devices are used, there may occur a problem with respect to the a problem with respect to the precision of the coordinate.

As described above, in the FIGS. 3A to 3C case, a strong electromagnetic wave can be transmitted to the pointing device 30B by means of simultaneous transmissions of electromagnetic waves from the antennae X3 and Y3, while at the same time weak electromagnetic waves are also transmitted to the pointing devices 30A and 30C and return thereto as interfering signals at the time of reception. In other words, in order to improve the coordinate precision, antiphase electromagnetic waves are required to be transmitted in cancel the transmission of the electromagnetic waves to the pointing devices 30A and 30C.

More specifically, when electromagnetic waves in phase with each other are outputted from the antennae X3 and Y3, electromagnetic waves with phases inverted to those from the antennae X3 and Y3 are also transmitted from the antennae Y5 and X5 crossing the antennae X3 and Y3 at the positions of the pointing devices 30A and 30C. When ac currents are respectively supplied into the antennae X3 and Y3, the strength of the electromagnetic wave, which is observed at the intersection of the antennae X3 and Y3 where the pointing device 30B lies, is two times greater then that caused by each antenna. At this time, the electromagnetic wave caused by two antennae arrives at the pointing device 30A, and similarly at 30C. However, since electromagnetic waves from the antennae X3 and Y5, are in antiphase, they are cancelled by each other at the position of the pointing device 30A, thus bringing the electromagnetic wave strength to appropriately zero. Similarly, at the position of the pointing device 30C, since electromagnetic waves from the antennae Y3 and X5 in antiphase, they are cancelled by each other to allow the electromagnetic wave strength to become zero. As a result, the electromagnetic wave reaches the pointing device 30B only and hence only the pointing device 30B provides a received signal, which makes it possible to more accurately obtain the position of the pointing device 30B.

In addition, as a way of effectively performing information exchange with a specific pointing device of a plurality of pointing devices each having a resonance circuit without changing the resonance frequency as described above, there is a method in which the resonance circuits of the other pointing devices are short-circuited so as not to be operable. More specifically, when all the resonance circuits of the pointing devices other than the specific one are short-circuited so as not to come into operation, the position measurement of the specific pointing device is allowed without interferences with the other pointing devices. This method has an advantage in that the measurement is relatively easy and that it is necessary for only one frequency if the number of the pointing devices is not extremely large. There is a problem which arises with this method, however, in that, when the number of the pointing devices to be simultaneously used increases, the efficiency deteriorates because command information is required to be supplied to each pointing device. In conclusion, when the number of the pointing devices is large, it is more effective that different resonance frequencies are assigned thereto.

Furthermore, in the case of using a plurality of pointing devices, when the number of the pointing devices increases, there is a possibility of being short of the frequencies to be assigned, in which case the same frequency can be assigned to two or more pointing devices which are placed so as not to suffer from mutual interference. From this, more pointing devices are usable.

In the FIG. 1 position detecting system, a plurality of oscillators whose oscillating frequencies are fixed, are employed. In addition, it is also appropriate to use, for example, a variable-frequency oscillator. For instance, a PLL circuit provides frequencies integer times the reference frequency, that is, a plurality of accurate frequencies are obtainable by taking advantage of a frequency synthesizer. In this case, for change of the oscillating frequency, it takes time until the frequency becomes stable, and therefore a plurality of variable-frequency sources are employed to save the time for stabilizing. Even in this case, there is an advantage in that its circuit scale becomes smaller as compared with the case that the fixed-frequency oscillators are used by the number equal to that of the pointing devices.

A description will be made below in terms of an arrangement of a pointing device suitable for the above embodiment. FIG. 8 is an illustration of an arrangement of a pointing device according to an embodiment. The pointing device, designated generally at reference numeral 100A, is equipped with a command receiving circuit 110 for receiving a command from the position detecting system and a command executing circuit 120 for executing the command. Further included is a coordinate detecting circuit 130 for detecting the position of the pointing device 100A above the position detecting system.

FIG. 9 illustrates an arrangement of a pointing device containing a resonance circuit which has connections with another embodiment. The pointing device 100B includes a resonance circuit 140 comprising at least a coil and a capacitor, and further includes a command receiving circuit 150 for receiving a command from the resonance circuit 140. The resonance frequency of the resonance circuit 140 is made to be changeable by a resonance state changing circuit 160 which is operative in accordance with command information from the command receiving circuit 110. This pointing device 110B receives a command at a frequency altered afterwards, and practices the position detection by means of the resonance circuit 140.

Figure 10:
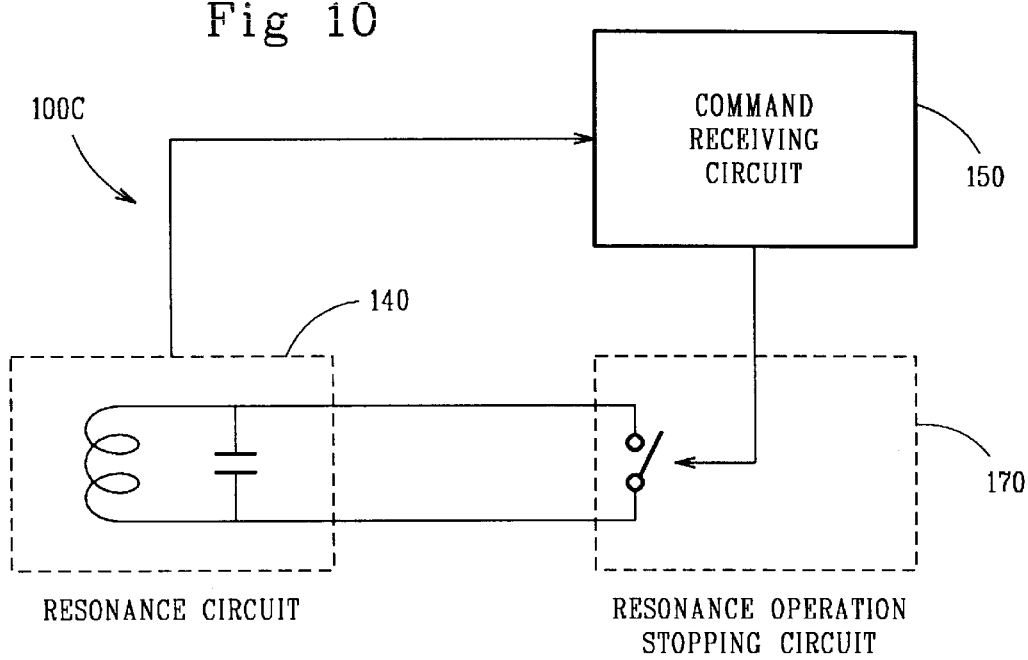
FIG. 10 is an illustration of a further arrangement of a pointing device according to the embodiment.

FIG. 10 shows an arrangement of an pointing device which has connections with a further embodiment. This pointing device 100C is provided with a resonance operation stopping circuit 170 which stops the resonance operation of the resonance circuit 140 in accordance with a command the command receiving circuit 150 receives.

Figure 11:
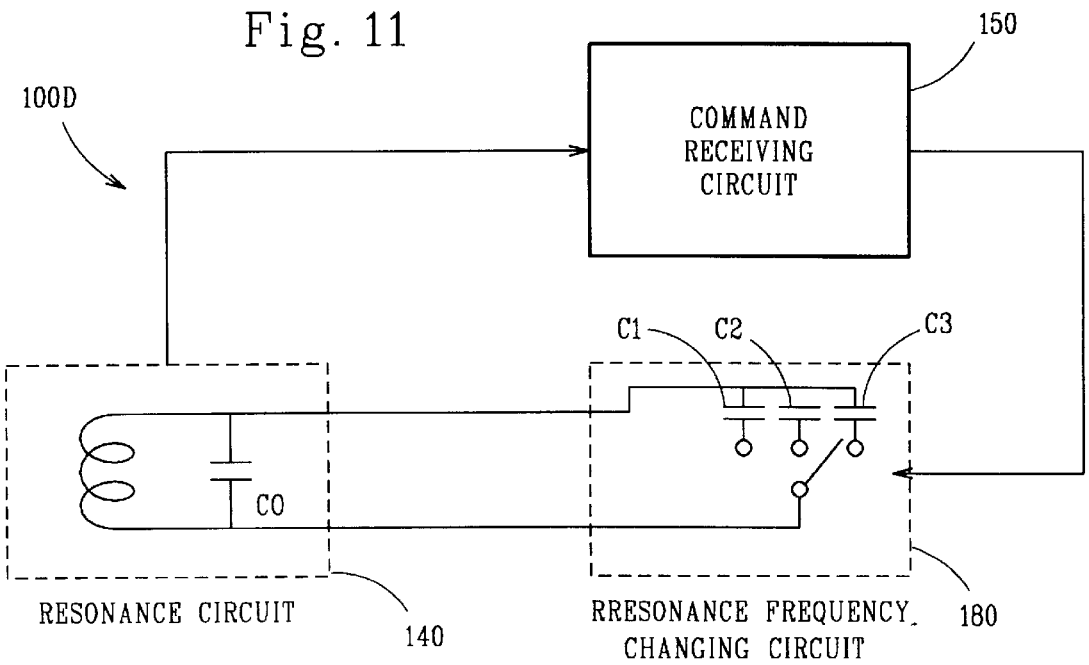
FIG. 11 is an illustration of a still further arrangement of a pointing device according to the embodiment.

In FIG. 11, a pointing device 100D has an arrangement in which a resonance frequency changing circuit 180 is incorporated which makes change to a resonance frequency other than the frequency taken for stopping the resonance operation of the resonance circuit 140.

Figure 12:
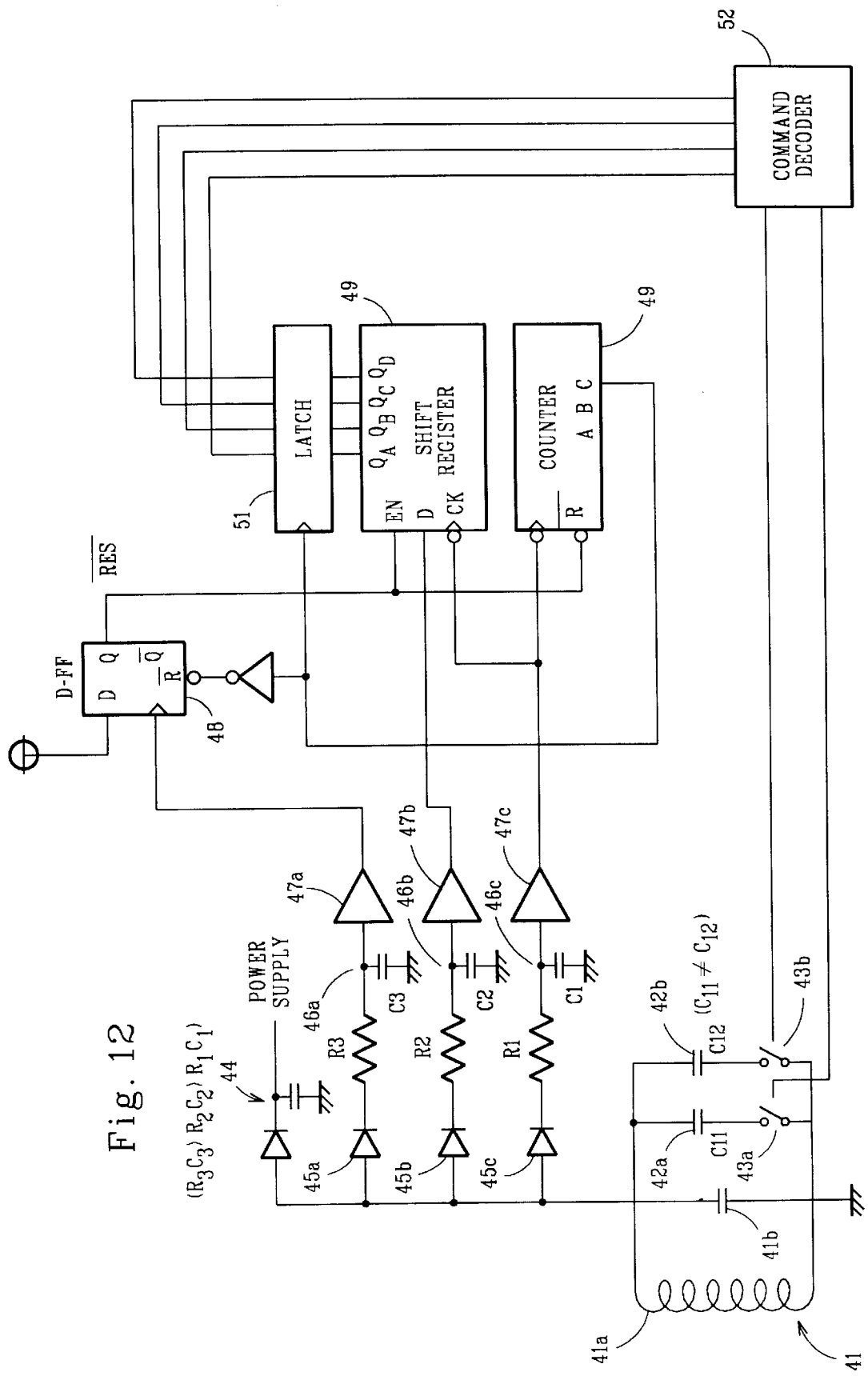
FIG. 12 shows an arrangement of an internal circuit of a pointing device according to an embodiment.

Furthermore, FIG. 12 shows one example of a circuit arrangement of the FIG. 9 pointing device where the resonance frequency is variable. As shown in the figure, a well-known resonance circuit 41 is structured with a coil 41a and capacitor 41b being coupled in series to each other. Capacitors 42a and 42b are respectively connected through switches 43a and 43b to the capacitor 41b of the resonance circuit 41 so that the resonance frequency of the resonance 41 is changed according to four combinations of on and off operations of these switches 43a and 43b. The resonance characteristic of the resonance circuit 41 is controlled to one of the four.

A rectifier 44 makes up a power extracting means which picks up a DC voltage from an induced voltage developed in the resonance circuit 41 and supplies it as a power supply voltage to other circuits. Moreover, using a detector 45a, low-pass filter (LPF) 46a and comparator 47a derive only an induced voltage continuing in excess of the longest time period is derived from an induced voltage developed in the resonance circuit 41 through the low-pass filter 46a which has a relatively large time constant (t), before being shaped to produce a switching signal. Further, using a detector 45b, low-pass filter 46b and comparator 47b, only an induced voltage appearing in excess of a predetermined time period is extracted from an induced voltage developed in the resonance circuit 41, through the low-pass filter 46b with an average time constant (t) before it is shaped to create a start-up timing signal. Still further, by means of a detector 45c, low-pass filter 46c and comparator 47c, an induced voltage occurring intermittently at a predetermined period for a constant duration sufficiently shorter that the foregoing predetermined time period is picked up from an induced voltage developed in the resonance circuit 41 and then shaped so as to produce a clock signal. Only the induced voltage continuing in excess of the longest time period is derived through the low-pass filter 46c with a relatively small time constant (t) and shaped to produce a switching signal. In this arrangement, a four-bit instruction, in which an electromagnetic wave whose duration is longer than a predetermined time period and shorter than the longest time period gives a "1" and an electromagnetic wave for a duration sufficiently shorter than the predetermined time period gives a "0", is issued from the position detecting system to the pointing device after an electromagnetic wave with a duration longer than the longest time period is previously added as a start-up bit.

In the illustration, numeral 48 represents a D flip-flop, making up a hold circuit connected to the comparator 47a, and numeral 49 designates a counter connected to the comparator 47c, which generates a reset signal to reset the D flip-flop 48. Further, numeral 50 denotes a shift register inputs the output signal of the comparator 47b, i.e., an instruction in accordance with a clock from the comparator 47c after the D flip-flop 48 is set in response to the output of the comparator 47a together with the counter 49, is started by its Q output. Moreover, numeral 51 indicates a four-bit latch for latching the output of the shift register 50 when the counter 49 reaches a predetermined value (here, "4"). The latched output is fed to a command decoder 52 which, in turn decodes the command so as to set the resonance frequency to a given value.

FIG. 13 is an illustration of operational waveforms appearing when using a pointing device, where (a) shows a transmission signal in the position detecting system side; (b) indicates a reception signal (induced voltage) of the resonance circuit 41; (c) denotes an output signal of the low-pass filter 46c; (d) represents an output signal of the comparator 47c; (e) designates an output signal of the low-pass filter 46b; (f) represents an output signal of the comparator 47b; (g) indicates an output signal of the low-pass filter 46a; (h) designates an output signal of the comparator 47a; (i) indicates a Q output of the D flip-flop 48; and (j) denotes a value of the counter 49.

As described above, according to this invention, irrespective of using a plurality of pointing devices, an electromagnetic wave strongly associated with the selected pointing device is transmitted, whereby it is possible to make information communication with a specific one of the plurality of pointing devices. In addition, in the case of a resonance circuit included in each pointing device, there is no need for a plurality of resonance frequencies being set to the pointing devices, while an electromagnetic wave strongly related to the selected pointing device is emitted which allows individual detections of the positions of the respective pointing devices, thus freely determining a combination of the pointing devices for the position detecting system. In addition, even if a number of pointing devices are employed, the effective utilization of the frequencies is possible.

As many apparently widely differing embodiments of this invention may be made without departing from the spirit and scope thereof, it is to be understood that the invention is not limited to the specific embodiments thereof except as defined in the appended claims.

What is claimed is:

1. A position detecting system which detects positions of at least two different cordless pointing devices on a two-dimensional plane and is equipped with a command electromagnetic-wave transmitting circuit for transmitting a command to said pointing devices, the position detecting system comprising:

a first group of antennae arranged successively in a first one of two directions orthogonal to each other within said two-dimensional plane;

a second group of antennae arranged successively in a second of the two directions that is orthogonal to said first direction within said two-dimensional plane;

selection means for selecting at least an antenna of said first and second antennae groups, which allows transmission of an electromagnetic wave to a first one of said pointing devices to be measured, said electromagnetic wave from the selected antenna being more strongly coupled to said first pointing device than to the other or second pointing device; and transmission means for transmitting said electromagnetic wave from said antenna, selected by said selection means, to said first pointing device to be measured.

2. The position detecting system as set forth in claim 1, wherein said first and second pointing devices are on said plane at the same time, and said selection means selects a plurality of antennae, and a combined electromagnetic wave made up of electromagnetic waves transmitted from said plurality of selected antennae with said transmission means is more strongly coupled to said first pointing device to be measured than to the other, or second, pointing device.

3. The position detecting system as set forth in claim 2, wherein said transmission means uses at least an antenna other than said plurality of selected antennae to transmit an electromagnetic wave whose phase is opposite to that of said combined electromagnetic wave transmitted from said selected antennae, said other or first-mentioned antenna being more strongly coupled to the other or second pointing device than to said different first pointing device to be measured.

4. The position detecting system as set forth in claim 1, wherein said first and second antennae groups are also for receiving electromagnetic waves for position detection.

5. The position detecting system as set forth in claim 4, wherein each of said first and second pointing devices contains a resonance circuit comprising at least a coil and a capacitor, and said transmission means transmits an electromagnetic wave with a frequency close to a resonance frequency of said resonance circuit of said first pointing device to be measured when detecting a position of said first pointing device to be measured, said transmission means being further provided with a reception circuit which receives through a portion of said antennae groups an electromagnetic wave returning from said resonance circuit of said first pointing device to be measured to detect said position of said first pointing device to be measured on the basis of a distribution of a received signal characteristic.

6. The position detecting system as set forth in claim 5, wherein said first pointing device further comprises a resonance operation stopping circuit means for stopping its own resonance circuit in accordance with the command it receives, and said transmission means transmits a command electromagnetic wave at least a portion of which includes a command for inhibiting said resonance circuit of said first pointing device to be measured from getting into operation when no detection is made in terms of said position of said first pointing device to be measured.

7. A position detection system as set forth in claim 5, wherein said first pointing device has a resonance frequency changing circuit for changing said resonance frequency of its own resonance circuit in accordance with the command which said first pointing device receives, and said transmission means transmits a command electromagnetic wave at least a portion of which includes a command for changing said resonance frequency of said resonance circuit to be measured, before transmitting an electromagnetic wave with a frequency close to the changed resonance frequency for position detection of said pointing device to be measured, and said reception circuit receives said electromagnetic wave.

8. A pointing device having a resonance circuit at least comprising a coil and a capacitor, and used in connection with a position detecting system without requiring a cord between said pointing device and said position detecting system, said pointing device comprising:

a reception circuit for receiving external command information from the detecting system; and a resonance state changing circuit for changing a resonance state of said resonance circuit in accordance with said command information which the reception circuit receives.

9. The pointing device as set forth in claim 8, wherein said resonance state changing circuit includes means which serve as a resonance operation stopping circuit for stopping a resonance operation of said resonance circuit.

10. The pointing device as set forth in claim 8, wherein said resonance state changing circuit includes means which act as a changing circuit for changing a resonance frequency of said resonance circuit, and when a plurality of pointing devices are used at the same time in connection with said position detecting system, said plurality of pointing devices have resonance frequencies substantially equal to each other at least at their initial states.

11. A position detecting system for detecting positions of first and second pointing devices that are on a two-dimensional coordinate plane at the same time, the position detecting system comprising:

scanning means for scanning a plurality of X-axial antenna elements and Y-axial antenna elements at an initial resonant frequency $f_0$ in order to obtain and measure reception signal strengths of said first and second pointing devices on said two-dimensional plane and allow approximate position measurement of said first and second pointing devices which are both initially receptive to said initial frequency $f_0$;

selection means for selecting at least a first antenna element based upon the measured signal strengths obtained by said scanning means, said selected first antenna element when transmitting being more strongly coupled to said first pointing device than to said second pointing device, said selected antenna element for transmitting a command signal to said first pointing device in order to change the resonant frequency of said first pointing device from said initial frequency $f_0$ to a second different resonant frequency $f_1$ so that said first pointing device is no longer receptive to said initial resonant frequency $f_0$ and so that said first and second pointing devices on said two-dimensional plane are receptive to different resonant frequencies; and detection means for measuring the coordinate position of said first pointing device based upon signals transmitted at said second resonant frequency $f_1$.

* * * * *